US009846849B2

(12) United States Patent
Damonte et al.

(10) Patent No.: US 9,846,849 B2
(45) Date of Patent: Dec. 19, 2017

(54) SYSTEM AND METHOD FOR PROVIDING AN EDITOR FOR USE WITH A BUSINESS PROCESS DESIGN ENVIRONMENT

(71) Applicant: ORACLE INTERNATIONAL CORPORATION, Redwood Shores, CA (US)

(72) Inventors: Nicolas Damonte, Buenos Aires (AR); Tomas Alabes, Buenos Aires (AR); Juan Manuel Allo Ron, Buenos Aires (AR); Nicolas Laplume, Buenos Aires (AR)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 4 days.

(21) Appl. No.: 14/295,917

(22) Filed: Jun. 4, 2014

(65) Prior Publication Data
US 2015/0082271 A1 Mar. 19, 2015

Related U.S. Application Data
(60) Provisional application No. 61/879,993, filed on Sep. 19, 2013.

(51) Int. Cl.
G06F 9/44 (2006.01)
G06Q 10/06 (2012.01)
(52) U.S. Cl.
CPC ............. G06Q 10/06 (2013.01); G06F 8/10 (2013.01)

(58) Field of Classification Search
CPC ...... G06F 8/35; G06F 17/30734; G06Q 10/06; G06Q 10/067; G06Q 10/10; G06Q 10/103; G06Q 10/0637; G06Q 10/063
See application file for complete search history.

(56) References Cited

U.S. PATENT DOCUMENTS 6,789,252 B1 * 9/2004 Burke ................ G06F 8/10
                                        717/100
6,898,783 B1 * 5/2005 Gupta ................ G06F 8/24
                                        715/853

(Continued)

OTHER PUBLICATIONS

Kamal Bhattacharya et al.; A Data Centric Design Methodology for Business Processes; 2009 IGI Global; pp. 503-505; <https://pdfs.semanticscholar.org/89fb/df84352c744b70c5e01552d297366302c585.pdf>.*

(Continued)

Primary Examiner — Thuy Dao
Assistant Examiner — Cuong V Luu
(74) Attorney, Agent, or Firm — Tucker Ellis LLP

(57) ABSTRACT

A system and method for providing an editor for use with a business process design environment. In accordance with an embodiment, the system provides an editor and framework that allows a user to create and edit business processes and business architecture projects. The editor can render or edit a model which is based on a metamodel or defined ontology, and can be provided, e.g., in computer applications, browsers and tablets. In accordance with an embodiment, the user can use the editor to define a business process and/or a business architecture project, including attributes such as goals, objectives, strategies, and value chains. Models can be synchronized as part of an overall business process development.

9 Claims, 14 Drawing Sheets

(56) References Cited

U.S. PATENT DOCUMENTS

| | | | | |
|---|---|---|---|---|
| 8,510,347 | B2* | 8/2013 | Gopalan | G06F 8/10 707/803 |
| 8,910,112 | B2* | 12/2014 | Li | G06F 8/36 709/227 |
| 2003/0187676 | A1* | 10/2003 | Hack | G06Q 99/00 705/348 |
| 2004/0177335 | A1* | 9/2004 | Beisiegel | G06Q 10/10 717/102 |
| 2007/0255715 | A1* | 11/2007 | Li | G06Q 10/00 |
| 2010/0031233 | A1* | 2/2010 | Li | G06F 9/541 717/106 |
| 2010/0153473 | A1* | 6/2010 | Gopalan | G06F 8/10 707/810 |
| 2010/0306732 | A1* | 12/2010 | Zhu | G06Q 10/10 717/105 |
| 2011/0029947 | A1* | 2/2011 | Markovic | G06Q 10/10 717/102 |
| 2012/0311521 | A1* | 12/2012 | Perisic | G06F 8/71 717/102 |
| 2014/0143750 | A1* | 5/2014 | Gangadharan | G06F 8/10 717/102 |

OTHER PUBLICATIONS

Christoph Zott et al.; Business Model Design an Activity System Perspective; 2009 Elsevier; pp. 216-226; <http://www.sciencedirect.com/science/article/pii/S0024630109000533>.*

Nirmit Desai et al.; Amoeba A Methodology for Modeling and Evolving Cross-Organizational Business Processes; 2009 ACM; 45 pages; <http://dl.acm.org/citation.cfm?id=1571632&CFID=968102588&CFTOKEN=66871225>.*

Michael Morris et al.; The entrepreneur's business model toward a unified perspective; 2003 Elsevier; pp. 726-755; <http://www.sciencedirect.com/science/article/pii/S014829630300242X>.*

Peter Keen et al.; Organizational Transformation through Business Models A Framework for Business Model Design; 2006 IEEE; 10 pages; <http://ieeexplore.ieee.org/stamp/stamp.jsp?arnumber=1579713>.*

Henry Chesbrough; Business Model Innovation Opportunities and Barriers; 2009 Elsevier; pp. 354-363; <http://www.sciencedirect.com/science/article/pii/S0024630109000569>.*

* cited by examiner

SYSTEM AND METHOD FOR PROVIDING AN EDITOR FOR USE WITH A BUSINESS PROCESS DESIGN ENVIRONMENT

CLAIM OF PRIORITY

This application claims the benefit of priority to U.S. Provisional Patent Application titled "SYSTEM AND METHOD FOR PROVIDING A GRAPHICAL EDITOR FOR USE WITH A BUSINESS PROCESS DESIGN ENVIRONMENT"; application Ser. No. 61/879,993; filed Sep. 19, 2013, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to software tools for creating business applications comprising one or more business processes.

BACKGROUND

A business process design environment usable within an enterprise computing environment, including ORACLE® Business Process Composer, a component of ORACLE® Business Process Management (BPM) Suite, enables users to create and customize BPM projects. A BPM project is a container for the resources used to create and support business applications and contains one or more business processes. Business Process Composer allows users to create and/or edit and deploy business process models. Business process models can be created based on process templates to provide an abstract definition of a business process without the implementation details required for a particular application. Typically, a business analyst working with Business Process Composer can collaborate with users working with other software tools, such as business developers and/or managers working ORACLE® BPM Studio, to add required implementation details and create process-based business applications.

SUMMARY

Described herein are systems and methods for creating a business architecture in a business design environment. In accordance with an embodiment, a system comprises a graphical editor accessible from within in the business process design environment, the graphical editor including a model component, a view component, and a controller component. The graphical editor enables loading, creating, and editing of a model for each of a business architecture project, a business process management project within the business architecture project, and a business process within the business process management project. The model is comprised of one or more metamodels from a common pool of metamodels that share a common ontology.

The graphical editor can be provided, for example, in computer applications, browsers and tablets. In accordance with an embodiment, the user working with the graphical editor can define a business architecture project as well as business process management projects and business processes used within the business architecture project, including attributes such as goals, objectives, strategies, and value chains. Models can be linked and synchronized as part of overall business process development.

In accordance with an embodiment, the model component of the graphical editor can be common to view components and controller components for multiple different models. In accordance with an embodiment, one or more of the components of the graphical editor are provided on a server and a user working with the graphical editor accesses the server via a client.

In an embodiment, the model component of the graphical editor includes a process asset manager (PAM) or repository for storage of models for business architecture projects, business process management projects, and business processes. In an embodiment, the model component is a service that stores and provides assets for generating business architecture projects, business process management projects, and business processes.

In accordance with an embodiment, a method for creating a business architecture in a business process design environment comprises providing a graphical editor accessible from within the business process design environment. The graphical editor includes a model component, a view component, and a controller component and enables loading, creating, and editing of a model for each of a business architecture project, a business process management project within the business architecture project, and a business process within the business process management project. The model is comprised of metamodels from a common pool of metamodels that share a common ontology.

The graphical editor can be provided, e.g., in computer applications, browsers and tablets. In accordance with an embodiment, the user working with the graphical editor can define a business architecture project as well as business process management projects and business processes used within the business architecture project, including attributes such as goals, objectives, strategies, and value chains. Models can be linked and synchronized as part of overall business process development.

In accordance with an embodiment, the method can provide a model component of the graphical editor that is common to view components and controller components for multiple different models. In accordance with an embodiment, one or more of the components of the graphical editor are provided on a server and a user working with the graphical editor accesses the server via a client.

In an embodiment, the method uses a model component that includes a process asset manager (PAM) or repository for storage of models of business architecture projects, business process management projects, and business processes. In an embodiment, the method uses a model component that is a service that stores and provides assets for generating business architecture projects, business process management projects, and business processes.

In accordance with an embodiment, a non-transitory computer readable medium includes instructions stored thereon which when read and executed by one or more computers cause the one or more computers to perform the steps comprising providing a graphical editor accessible from within a business process design environment. The provided graphical editor includes a model component, a view component and a controller component and enables loading, creating, and editing of a model for each of a business architecture project, a business process management project within the business architecture project, and a business process within the business process management project. The model is comprised of metamodels from a common pool of metamodels that share a common ontology.

In accordance with an embodiment, the instructions can provide a model component of the graphical editor common to view components and controller components for multiple different business architecture models. In accordance with an embodiment, one or more of the components of the graphical editor are provided on a server and a user working with the graphical editor accesses the server via a client.

In an embodiment, the instructions provide a model component that includes a process asset manager (PAM) or repository for storage of models of business architecture projects, business process management projects, and business processes. In an embodiment, the instructions provide a model component that is a service that stores and provides assets for generating business architecture projects, business process management projects, and business processes.

DETAILED DESCRIPTION

Business processes are collections of related, structured activities or tasks that produce a specific service or product, or serve a particular goal for a particular customer or customers, including customers internal and external to an organization. The specific service, product, or goal can be tied to the business capability that the business process implements. A business process can be visualized with a flowchart as a sequence of activities with interleaving decision points that can be resolved with rules based on the data in the process. Business processes are often modeled to test newly developed business processes or to improve process efficiency and quality of an existing business process. Typically, process analysts are responsible for creating the initial flow of a business process and documenting its steps. This also includes identifying and defining the key performance indicators (KPIs) and high level rules that define the routing artifacts of the business process. Process analysts can benefit from the use of business process models to perform simulations to calculate and estimate return on investment (ROI).

Figure 1:
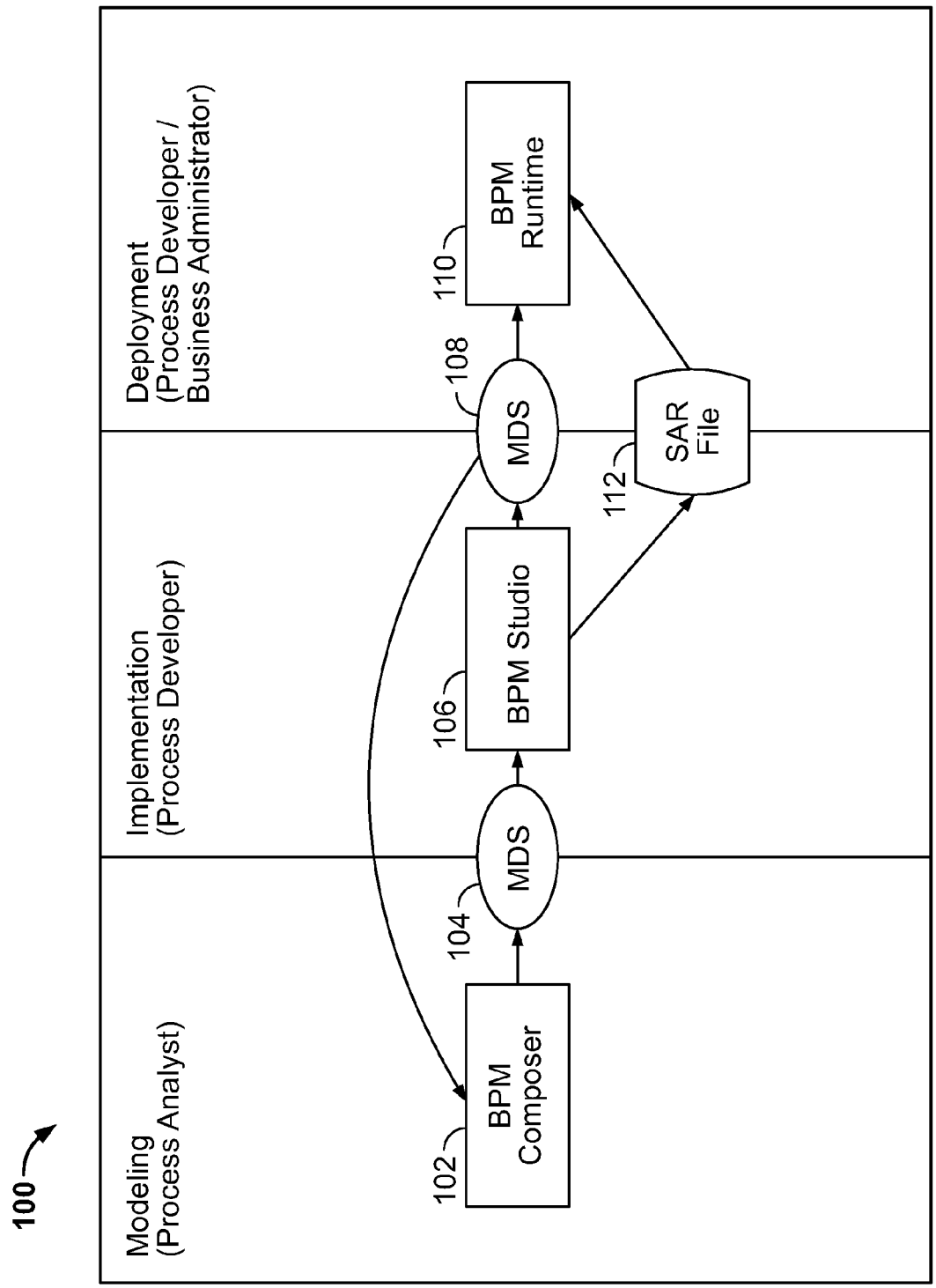
FIG. 1 illustrates a workflow for generating and deploying a business process, in accordance with an embodiment.

FIG. 1 illustrates a typical workflow 100 for using a business process design environment (also referred to herein simply as a design environment) such as Business Process Composer 102 to perform initial process modeling. The workflow involves a process analyst employing Business Process Composer to create a BPM project including business process blueprint(s) which can then be opened in a separate program for implementation. Once created, the process analyst can publish the BPM project containing the business process blueprint(s) to a metadata service (MDS) repository 104. A process developer can then open the BPM project in a program, such as BPM Studio 106, to implement the BPM project as part of a process-based business application. The process developer and/or a business administrator can publish the process-based business application to a second MDS repository 108 and deploy the BPM project to run time 110. Alternatively, the process-based business application can be saved as a project template or exported to a service archive (SAR) file 112, which can then be deployed by a business administrator to run time.

While certain roles have been used to describe the workflow of FIG. 1 above, it should be noted that these are merely exemplary roles. For example, the process analyst role and the process developer role can be performed by the same actor or separate actors. Likewise, the business administrator role can be performed by the same actor as or a separate actor from the process developer and process analyst roles. Likewise, the process analyst role, the process developer role, and the business administrator role all use exemplary titles, and can alternatively have different and/or overlapping titles. Actors may be described herein according to these exemplary roles, or more generally as "users" of software tools.

Business architecture (BA), in accordance with embodiments, defines the functional structure of an enterprise in terms of the collective business services and business information of the enterprise. Business capabilities are the top layer of the business architecture. A business capability is defined by business services that state "what" the enterprise does, while business processes implement business functionality and define "how" the enterprise can execute its capabilities. A business capability is defined when its business functionality is identified and implementation resources are reserved. Business capabilities can comprise applications including one or more business processes and can be modeled using business process model(s) created in a design environment.

Examples of business capabilities include, but are not limited to, enterprise maps, strategy maps and value chains.

Enterprise maps include models that show key process areas or that provides key business functions, services or products.

Strategy maps include models that help in propagating goals or corporate objectives from the enterprise level all the way to business and other objectives that in turn lead to actionable business process transformation and projects. Strategy map models provide the ability to prioritize efforts, justify decisions, and trace activities of an organization, for example, an information technology (IT) organization, to strategic goals of the business.

Value chains include models that show high level processes that make up the value chain of an enterprise. Generally, value chain models are high level conceptual models where each step in a conceptual model might in turn point to another conceptual model of comparatively finer granularity, or to a detailed process flow, such as a business process model and notation (BPMN) process flow.

A business capability is typically modeled using, and thereafter associated with and tied to, business process models that are proprietary to that business capability. Support for new business capability models with varied purposes—compare for example strategy map models and value chain models—can require building new model templates. Building a new business capability model with business services and processes proprietary to the business capability model can be onerous, and can result, for example, in business processes that do not share a common ontology.

Described herein are systems and methods for creating a business architecture in a business process design environment. In accordance with an embodiment, the system comprises a graphical editor and framework that allows a user to create and edit BA projects, such as business capabilities, BPM projects within the BA projects, and business processes within the BPM projects. A BA project can wrap BPM projects and can be constructed from pool(s) of metamodels and/or ontologies that are common to multiple BA projects. The graphical editor can render or edit a model which is based on a metamodel and/or defined ontology, and can be provided, for example, in computer applications, browsers and tablets.

In accordance with an embodiment, a user working with the graphical editor can define attributes such as goals, objectives, strategies, and value chains. For example, process steps in a value chain model can be associated with objectives, risks and KPIs. Processes, projects, and models can be linked and synchronized as part of an overall business process development.

Figure 2:
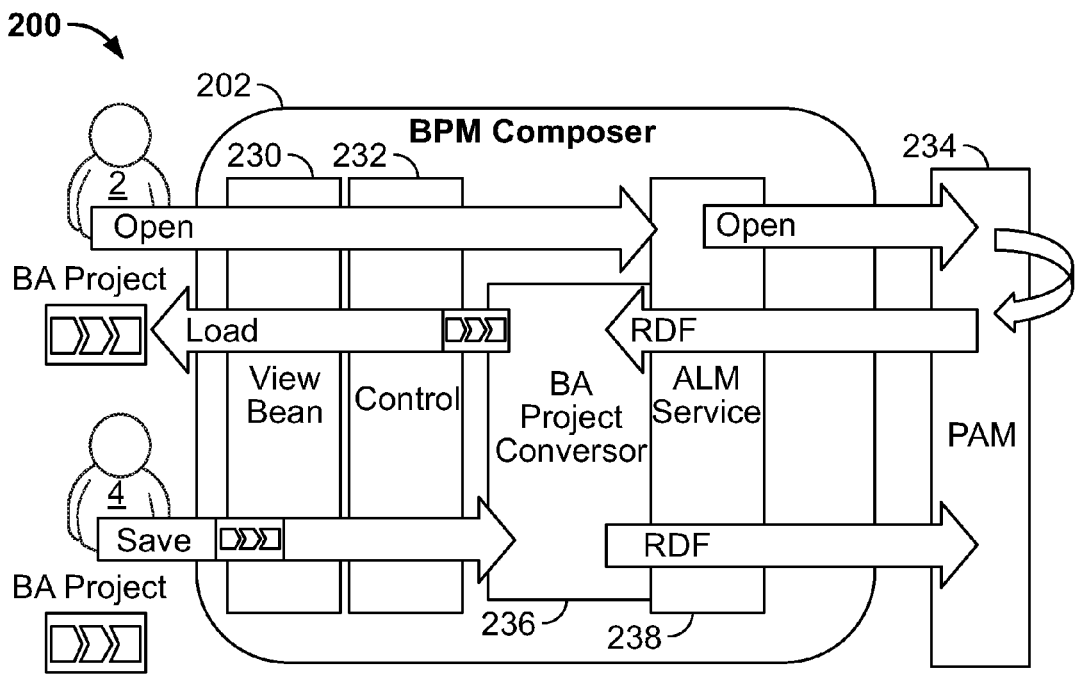
FIG. 2 illustrates a business process design environment, in accordance with an embodiment.

FIG. 2 illustrates a system for creating a business architecture in a design environment, in accordance with an embodiment. A user, for example a process analyst and/or process developer, can employ a graphical editor of the system to load, create, or edit BA projects, BPM projects within the BA projects, and/or business processes within the BPM projects, and/or other models. In an embodiment, the graphical editor can provide a process canvas, usable as a drawable area of a model wherein model components can be added or removed.

In accordance with an embodiment, the graphical editor allows a user to create business process models (and/or other models) based on a model-view-controller (MVC) framework. The system includes a design environment, such as BPM Composer 202, including a model component or service 234, a view component 230 and a controller component 232. The view component requests information from the model component that is needed for generating an output representation to a first user 2. The controller component can send commands to the model component to update the state of the model and can send commands to the view component to change the output representation of the model. The model component notifies the view component and controller component when there is a change in the state of the model, allowing the view component to produce updated output and the controller component to change the available set of commands.

In accordance with an embodiment, the model component or service can include a process asset manager (PAM) which acts as a repository of BA projects, BPM projects, business processes, and/or other assets. In accordance with an embodiment, a view component such as a view bean component delegate's access to the control component, which then accesses a PAM or repository application program interface (API), to connect to the repository.

In accordance with an embodiment, the system can include a conversion component, for example BA project convertor 236, that sends information to and receives information from the repository in, for example, a resource description framework (RDF) format. The BA project converter can be used to convert information in RDF format received from the repository so that the information can be used to generate an in-memory metamodel that can be graphically represented, for example, on a browser viewable by the user. Further, the BA project converter converts information represented in a metamodel that is created and/or edited in the design environment by a user to a format useable by the repository. The user can modify projects, processes and other models in a design environment and then save the modified process, project, or model back to, e.g., the PAM or another repository, where it can be subsequently used by other users and with other BA projects, BPM projects, and businesses processes.

In FIG. 2, the first user is shown requesting to view a BA project, and the command is relayed to the PAM repository. The PAM repository responds with information in RDF format. The information is converted to the in-memory metamodel and is viewable by the first user. A second user 4 is shown saving a BA project. Models of the project are converted to information in RDF format and stored in the PAM repository.

In accordance with an embodiment, the MVC framework can be a JavaScript framework. A RaphaelJS library or other library can be used to support views. JavaScript Object Notation (JSON) can be used to support communication between a client and a server. In other embodiments, another or a different framework can be used to generate views. Likewise, in other embodiments, another or a different format can be used to communicate between client and server. Commands and events can be communicated to maintain model synchronization, with minimum overhead and programmatic ease of use. Through the use of commands as units of actions, communication overhead can be reduced, and opportunities for further extension to other model types, actions, and environments can be achieved.

In accordance with an embodiment, the graphical editor can support a variety of BA models (e.g., enterprise maps, strategy maps, value chains, etc). The model component of the graphical editor can be accessed by different clients and by different BA projects, such as business capabilities, to provide a set of common metamodels and/or ontologies. The system can be used to empower a top-down approach to the design of a business environment, providing tools that can be employed by, for example, a process analyst, process developer, business administrator or other user, to define the business environment in terms of business capabilities, such as strategy maps, value chain, business model, abstract and other models, and track their evolution during development. In accordance with an embodiment, an application lifecycle management (ALM) service 238 can allow shared and separate models to have separate lifecycles between BA projects, allowing them to be independent from one another while still providing traceability.

Figure 3:
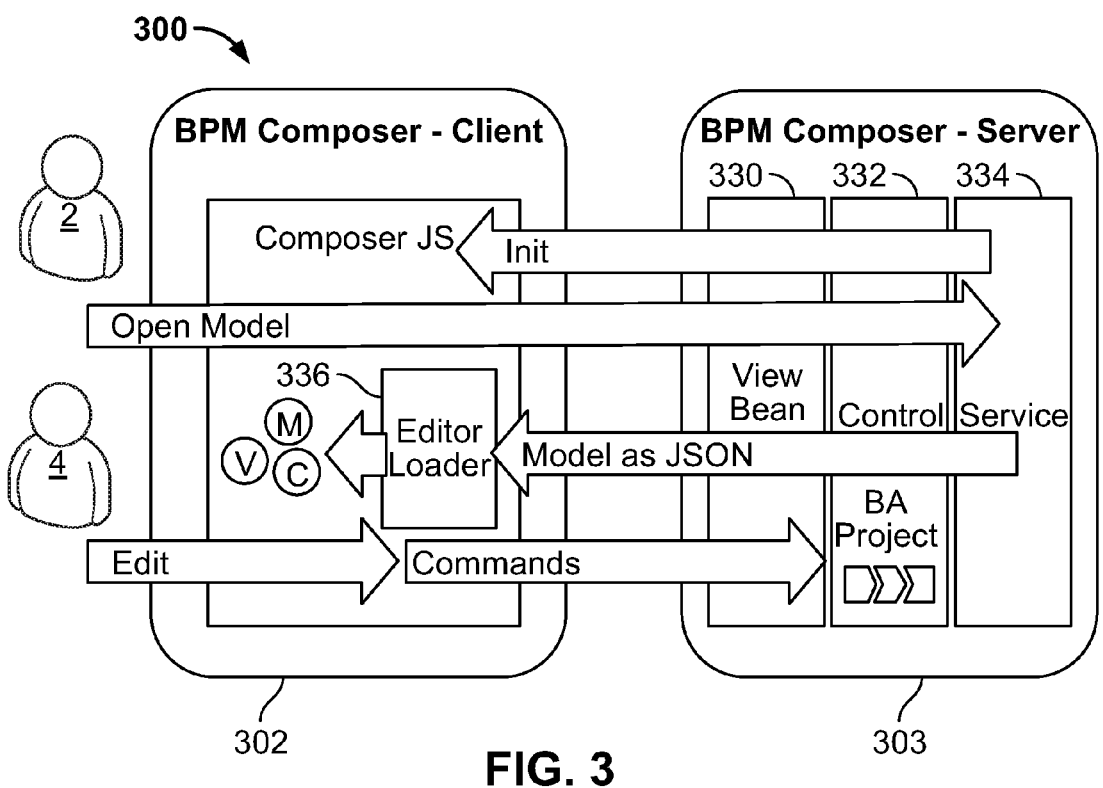
FIG. 3 illustrates a business process design environment, in accordance with an embodiment.

FIG. 3 illustrates a system for creating a business architecture in a design environment, in accordance with another embodiment. As shown, a user can employ a client component 302 of the design environment that provides an interactive workspace for creating and editing projects and models. The client can comprise, for example, an interactive browser. The client allows the user to open models and projects stored on a server component 303 of the design environment. The models and projects can then be communicated to the client from a model service of the server. The models and projects can be communicated, for example, via JSON where an editor/loader 336 renders the project in composer JavaScript (JS) for viewing and editing by the user on the client. The user can edit a model and/or project on the client and commands are sent to a controller component 332 of the editor via the view bean component 330 of the editor at the server. Multiple different clients can access the server, with the clients acting as editors and the server saving and/or generating metamodels. As shown, a first user 2 opens a model which sends a command to the model service 334 and an in-memory model is generated and loaded using the editor loader 336. A second user 4 edits a project which is saved and sent to a controller to update the project.

In accordance with various embodiments, the editor is a graphical editor that supports a variety of tools that allow the user to edit models, projects, and/or processes. The user can then include edited models within a BPM or BA project, which is updated at the server. Because the graphical editor can be based on a MVC framework, the graphical editor can be used to render or edit many different types of models which are based on a metamodel or defined ontology stored in a repository or by an accessible service common to multiple business capabilities within the business architecture.

Figure 4:
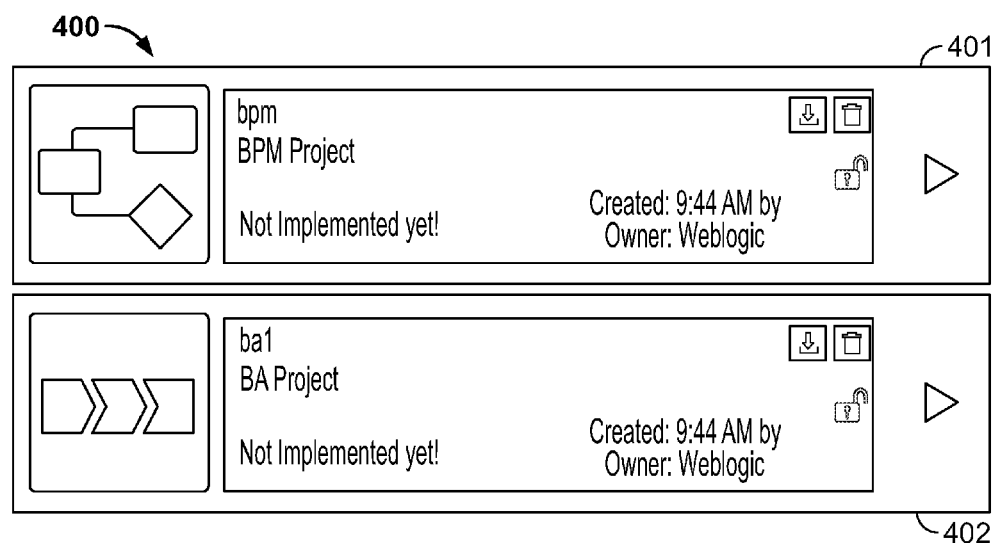
FIG. 4 illustrates a portion of a workspace displayed in an editor for use with a business process design environment, in accordance with an embodiment.

FIG. 4 illustrates an exemplary screenshot of a portion of a workspace displayed on a graphical editor in a design environment, in accordance with an embodiment. The screenshot illustrates how a user working with the graphical editor can define a BPM project, business process and/or a BA project, and models for use therewith. As shown, the editor 400 displays a pair of projects 401, 402 that have been created but that have not yet been implemented.

Figure 5:
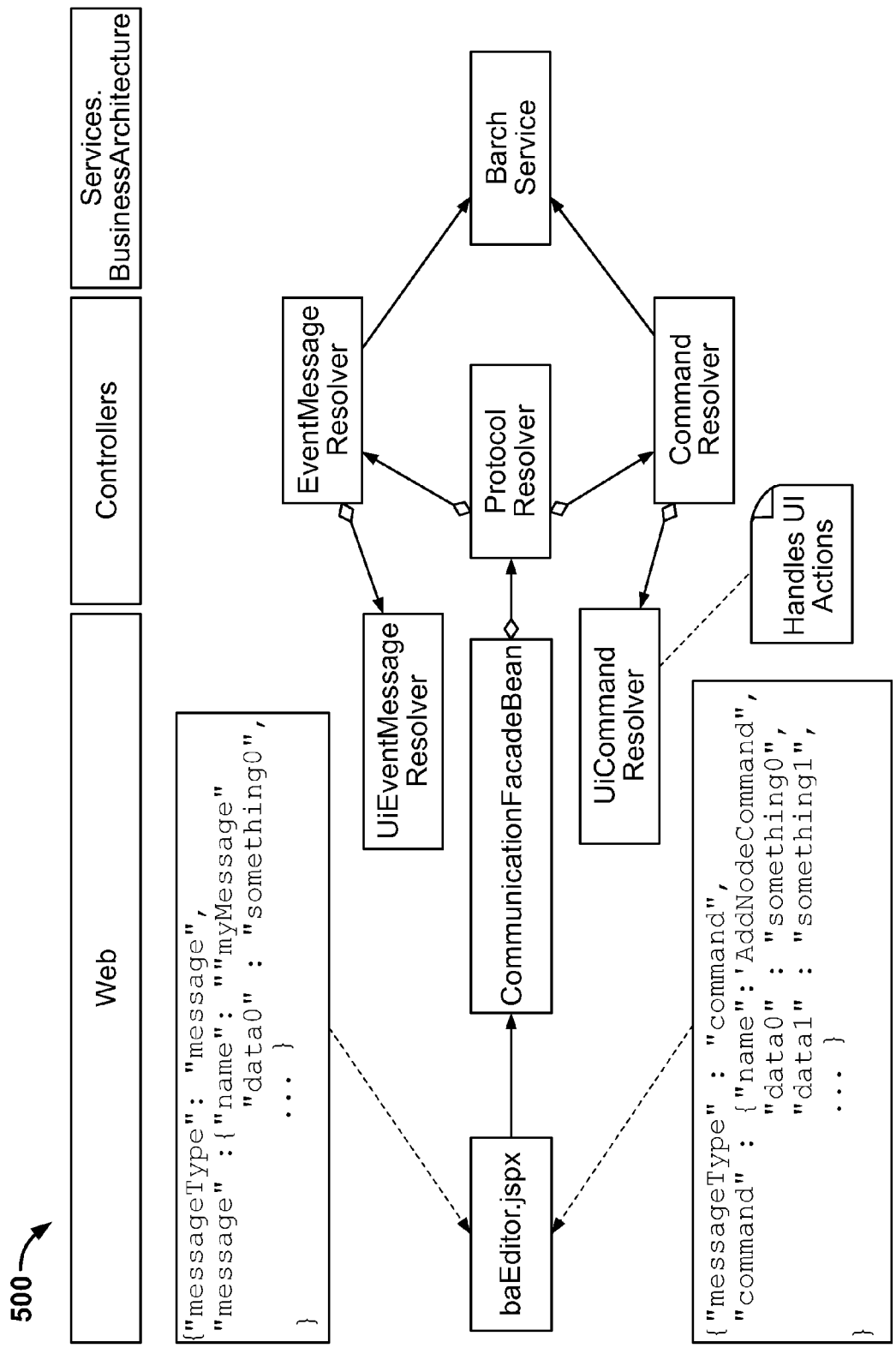
FIG. 5 illustrates an example of communication via scripts between components of a business process design environment, in accordance with an embodiment.

FIG. 5 illustrates use of a graphical editor 500 in a design environment, in accordance with an embodiment, illustrating how the graphical editor can communicate with controllers to interact with the BPM project, business processes and/or BA projects. The graphical editor makes use of a framework to provide an object-oriented programming model for HTML declarative code. The code is included in a command (e.g., script baEditor.jspx) forwarded via a javabean (labeled CommunicationFacadeBean) to one or more controllers. A protocol resolver of the controller is responsible for initiating and sequencing the queries that ultimately lead to a full resolution (translation) of the resource sought. The resolver interface is a utility class used to resolve objects based on a request. The protocol resolver sends requests based on the contents of the bean to a message resolver and a command resolver which access the business architecture service (Barch Service) to access projects and saved models.

Figure 6:
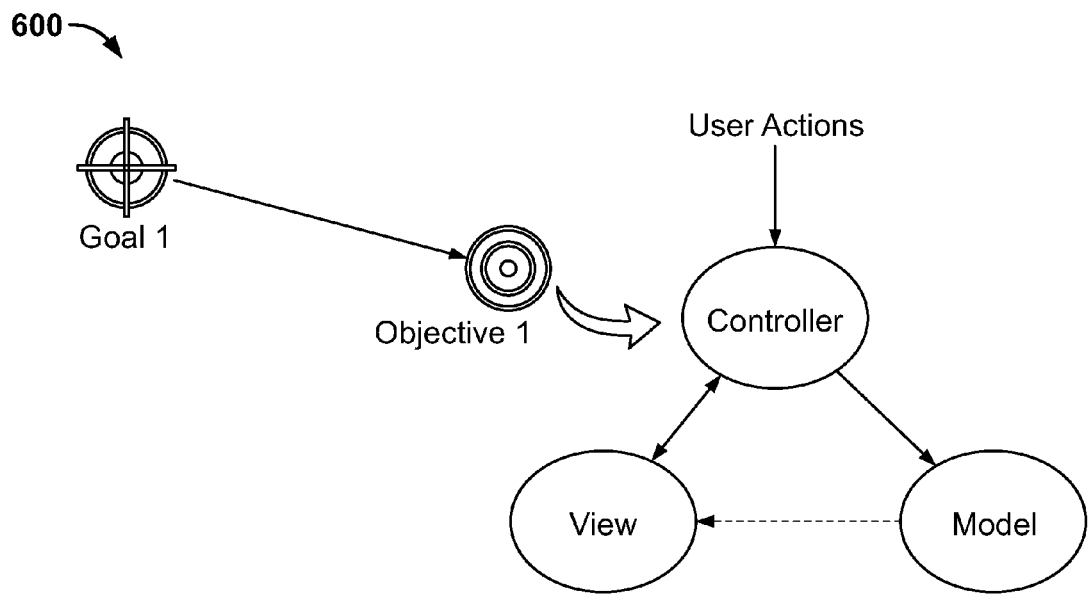
FIG. 6 illustrates integration of goals and objectives into a business process model, in accordance with an embodiment.

FIG. 6 illustrates integration 600 of goals and objectives into a business process model, in accordance with an embodiment. For example, a Strategy map model can include goals, which can be broken down into objectives. A goal and/or objective can include a key process indicator (KPI) generated from performance data. The goal and/or objective can be integrated into a model so that the business process can act, for example during certain tasks in the process, based on the results of the KPI.

Figure 7:
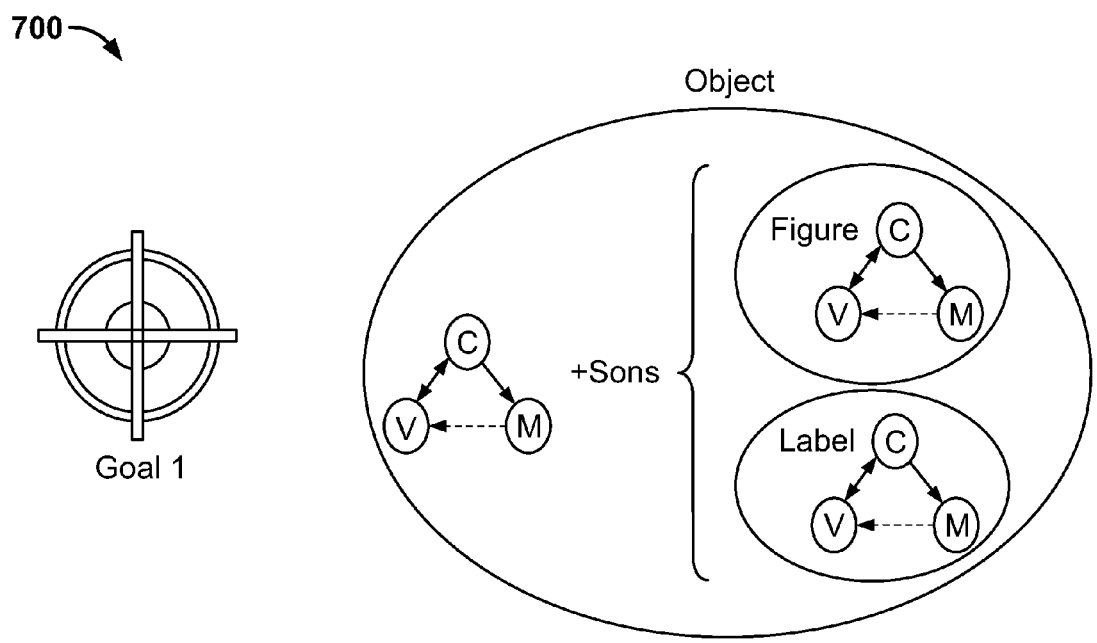
FIG. 7 illustrates a hierarchy structure for an object including a business process model, in accordance with an embodiment.

FIG. 7 illustrates a hierarchy structure 700 for objects for communicating a business process model, in accordance with an embodiment. The objects include fields for the figure that displays the model and fields for the label for the model.

Figure 8:
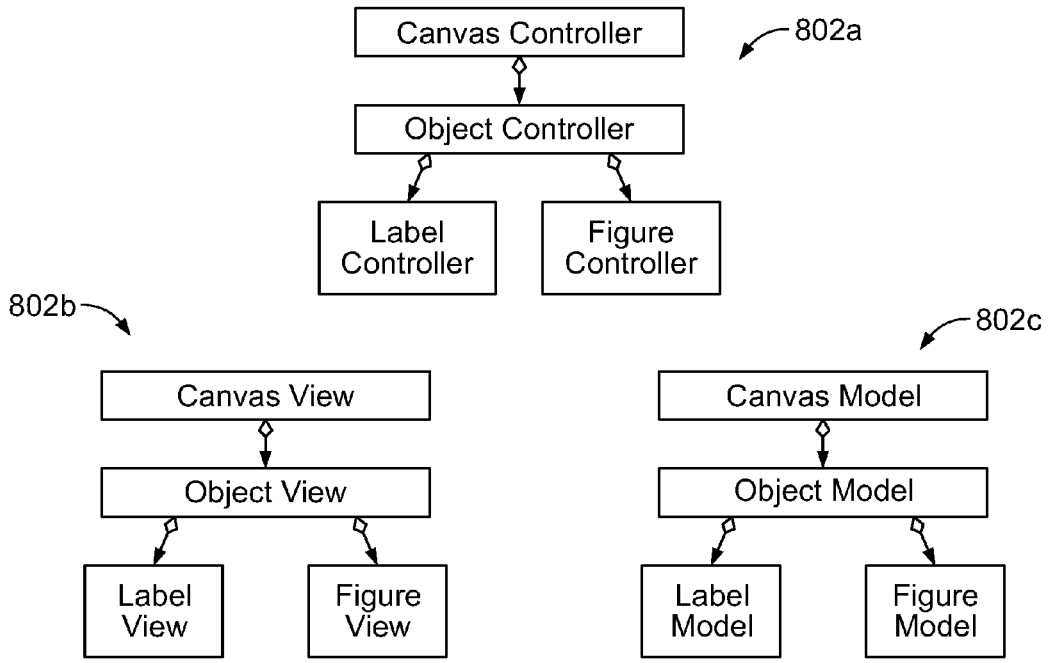
FIG. 8 illustrates a tree composition for the different components of a business process design environment, in accordance with an embodiment.

FIG. 8 illustrates a tree composition 802a, 802b, 802c for data structures of the separate components of a business process model.

Figure 9:
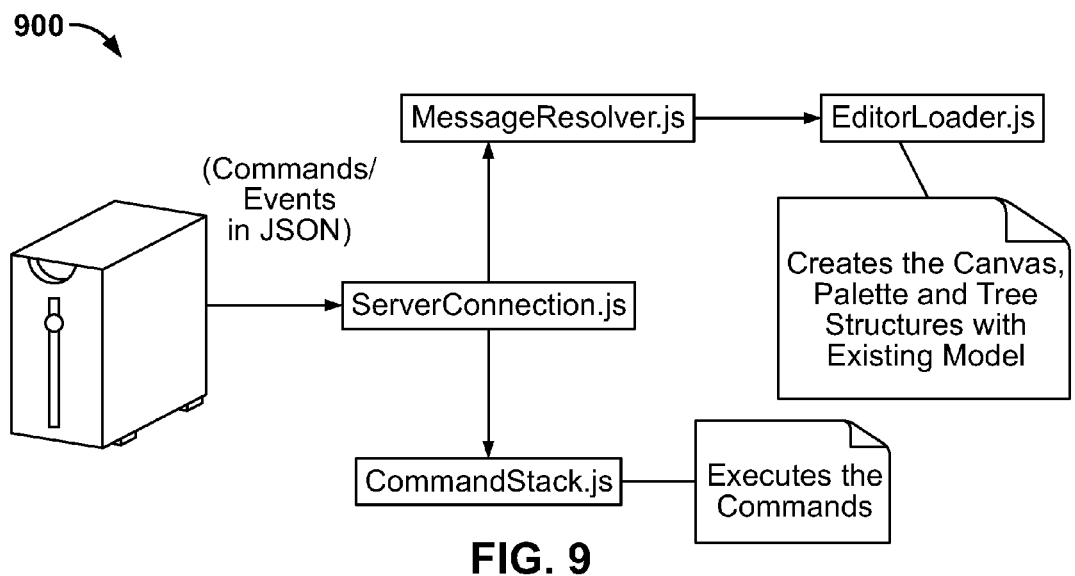
FIG. 9 illustrates a command structure for a server connecting with a client, in accordance with an embodiment.
Figure 17:
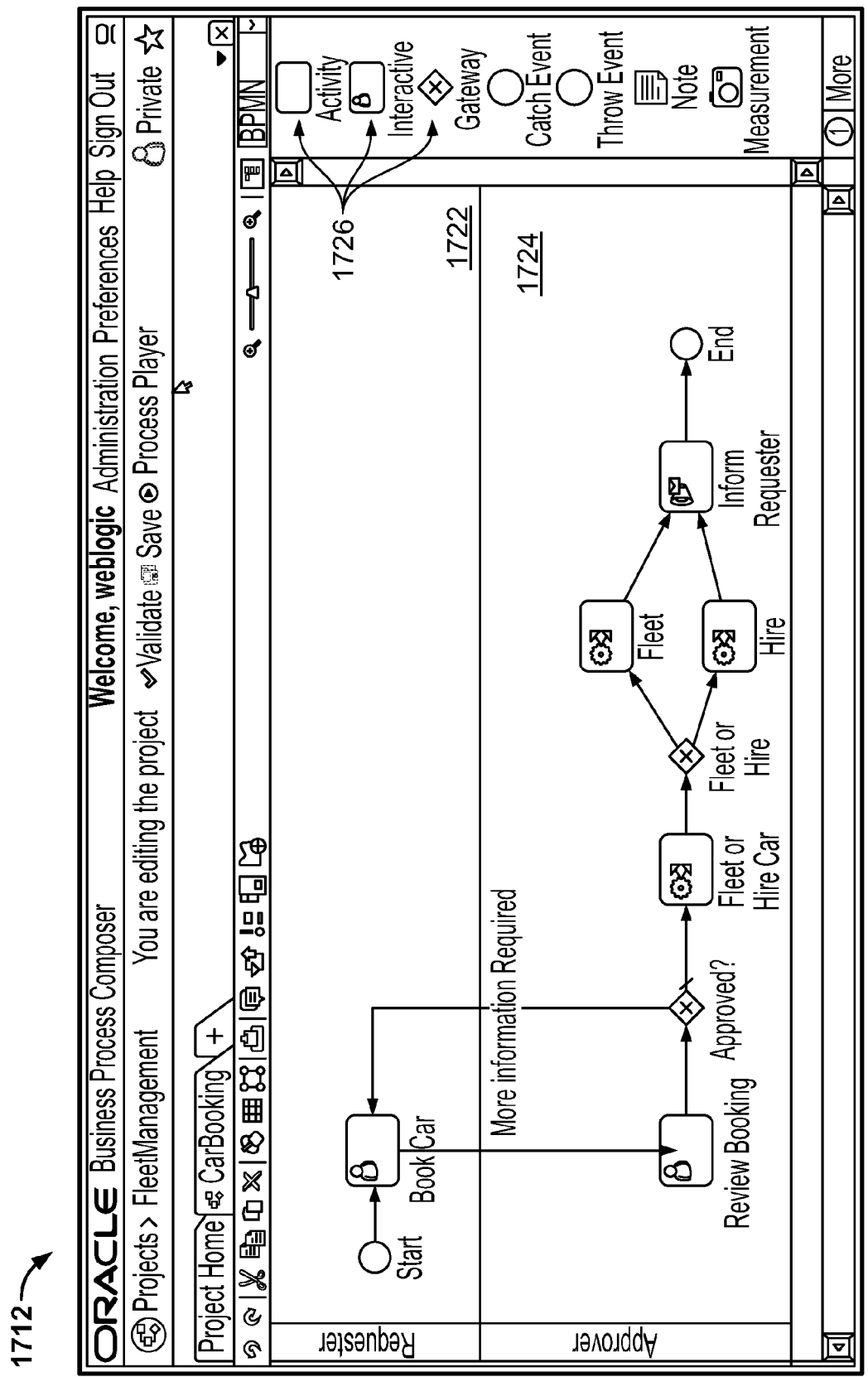
FIG. 17 illustrates an exemplary business process created within an interactive workspace of a business design environment, in accordance with an embodiment.

FIG. 9 illustrates communication 900 between a client and a server using JSON. A connection between client and server is established (e.g., via connecting script ServerConnection.js). A command is then sent to the client (e.g., via script MessageResolver.js) which translates and forwards a command to create a representation of the model within an interactive canvas (e.g., via script editorLoader.js). The representation and canvas can include a palette and tree structures, for example as illustrated in FIG. 17. Further, a parallel command is sent to the client to execute commands from the server (e.g., via script CommandStack.js).

Figure 10:
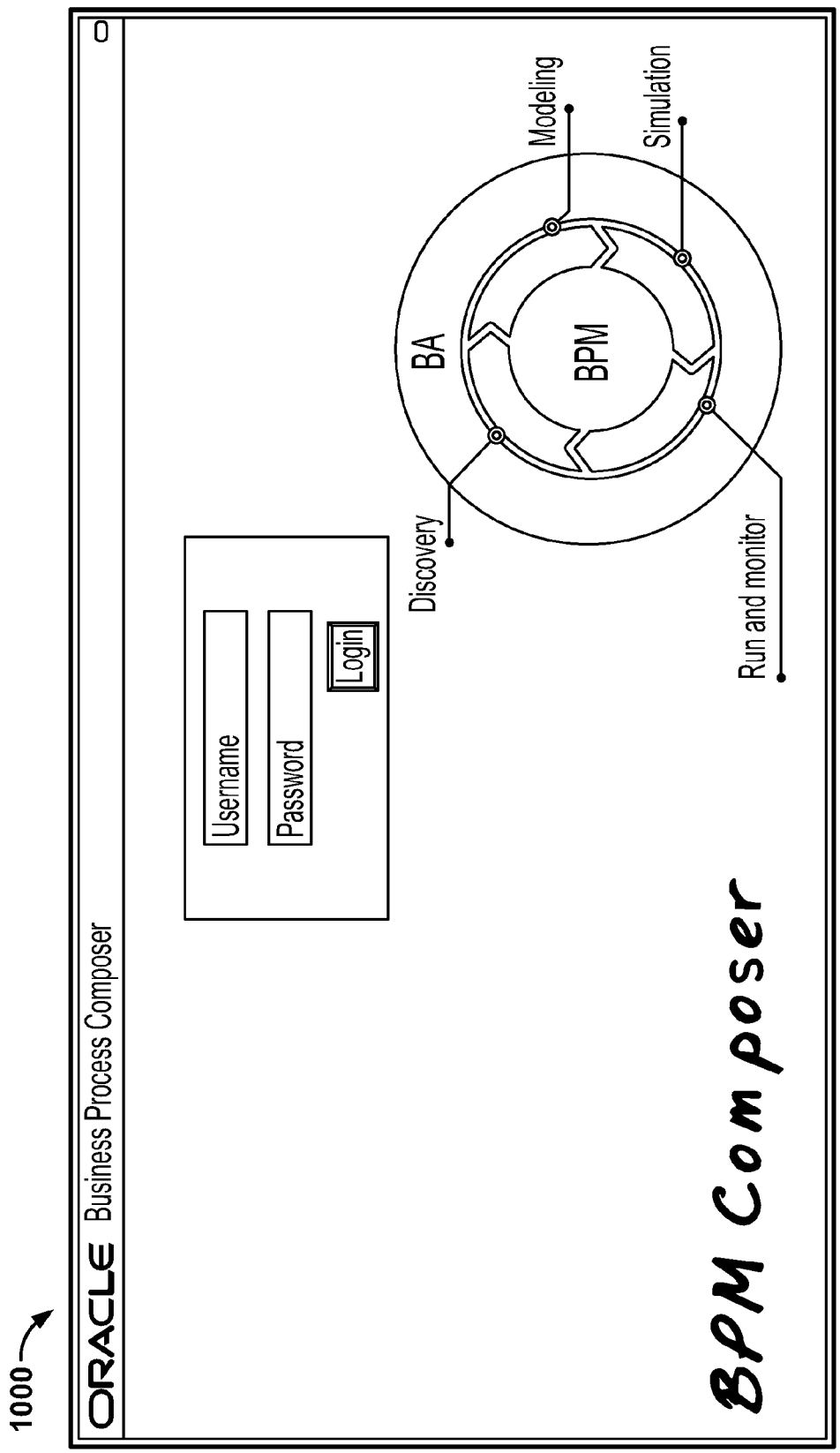
FIG. 10 illustrates a screenshot of a login screen of an editor for use with a business process design environment, in accordance with an embodiment.

FIGS. 10-15 illustrate a series of screenshots for a graphical editor for use with a design environment, in accordance with an embodiment. As will be appreciated, the screenshots are merely exemplary and can vary extensively both visually and functionally. The graphical editor can also include more or fewer features and steps for creating projects and processes. FIG. 10 illustrates a screenshot 1000 of a login screen that allows a user to access Business Process Composer. The user can be, for example, a process analyst, process developer and/or business administrator. Login requires entry of a username and password.

Figure 11:
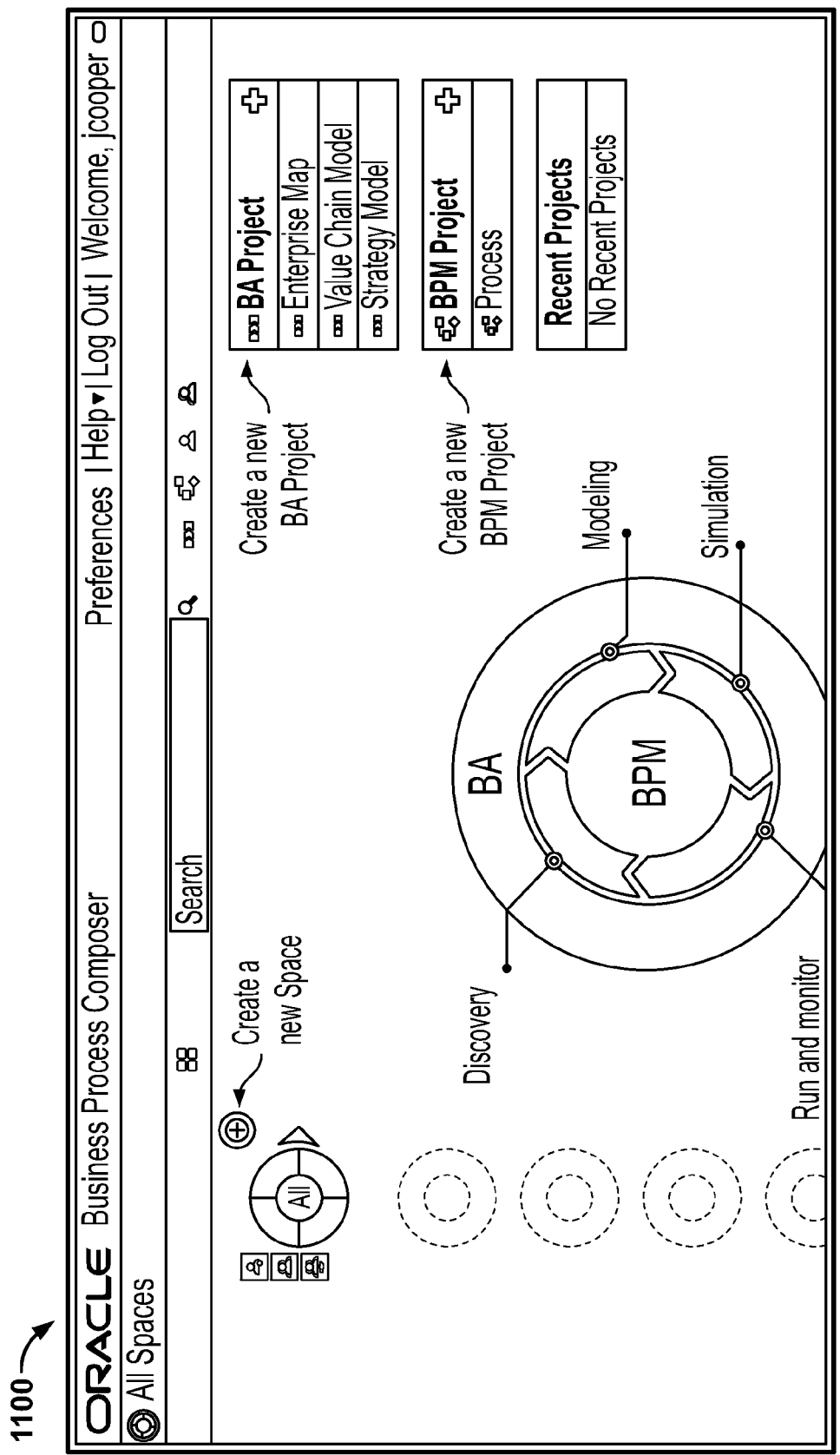
FIG. 11 illustrates a screenshot of a home screen of an editor for use with a business process design environment, in accordance with an embodiment.

FIG. 11 illustrates a screenshot 1100 of a homepage allowing the user to create a new BA project or BPM project and allowing the user to create separate spaces containing projects.

Figure 12:
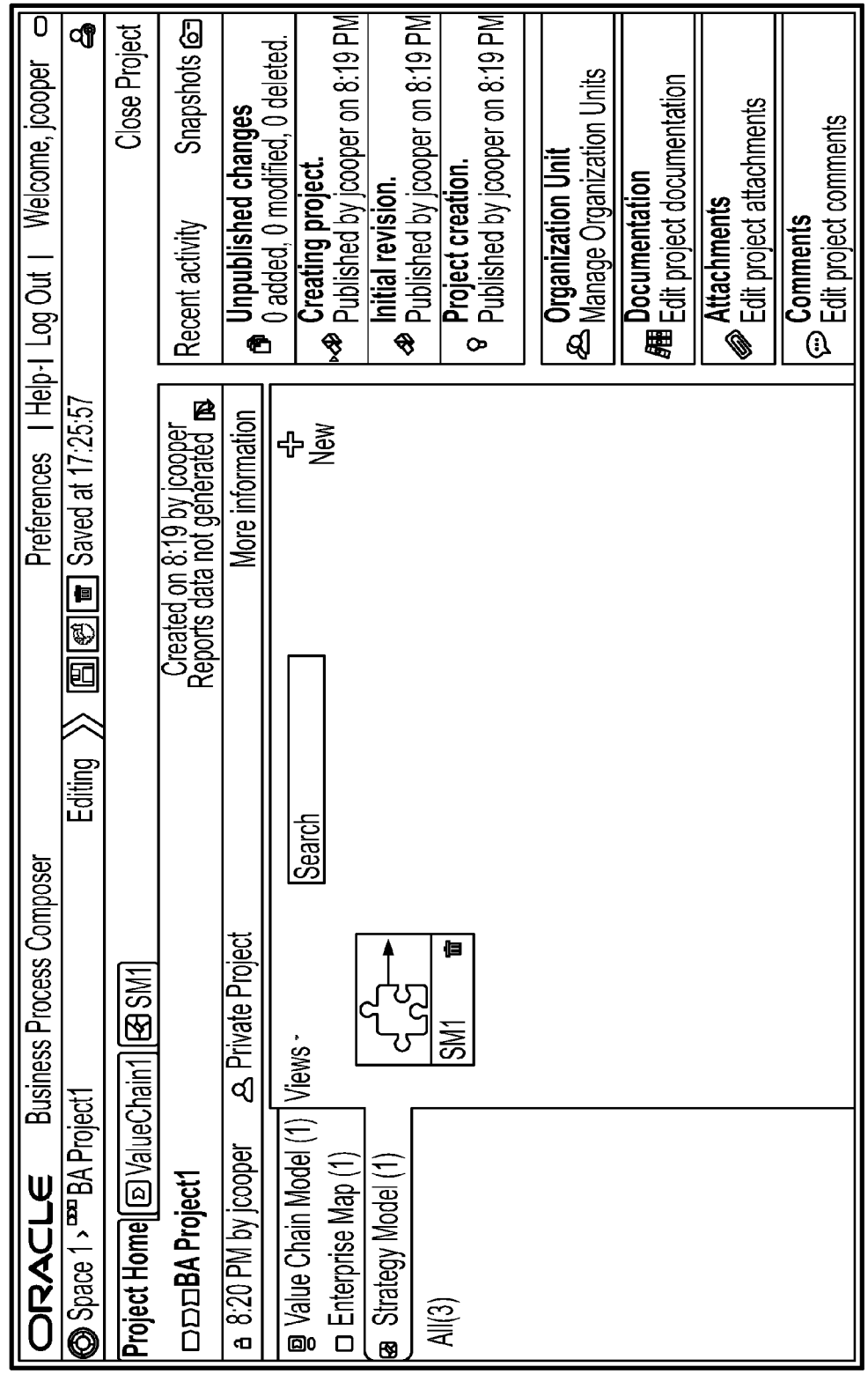
FIG. 12 illustrates a screenshot of a business architecture (BA) project edit screen of an editor for use with a business process design environment, in accordance with an embodiment.

FIG. 12 illustrates a screenshot 1200 of a project page for a first BA project created by a user in new space Space1 and labeled BA Project1. BA Project1 includes selections for value chain models, enterprise maps, and strategy models. The user has selected strategy models, and the strategy maps included in the BA project are displayed in the main workspace. As shown, the strategy models workspace includes an icon for a single model labeled SM1.

Figure 13:
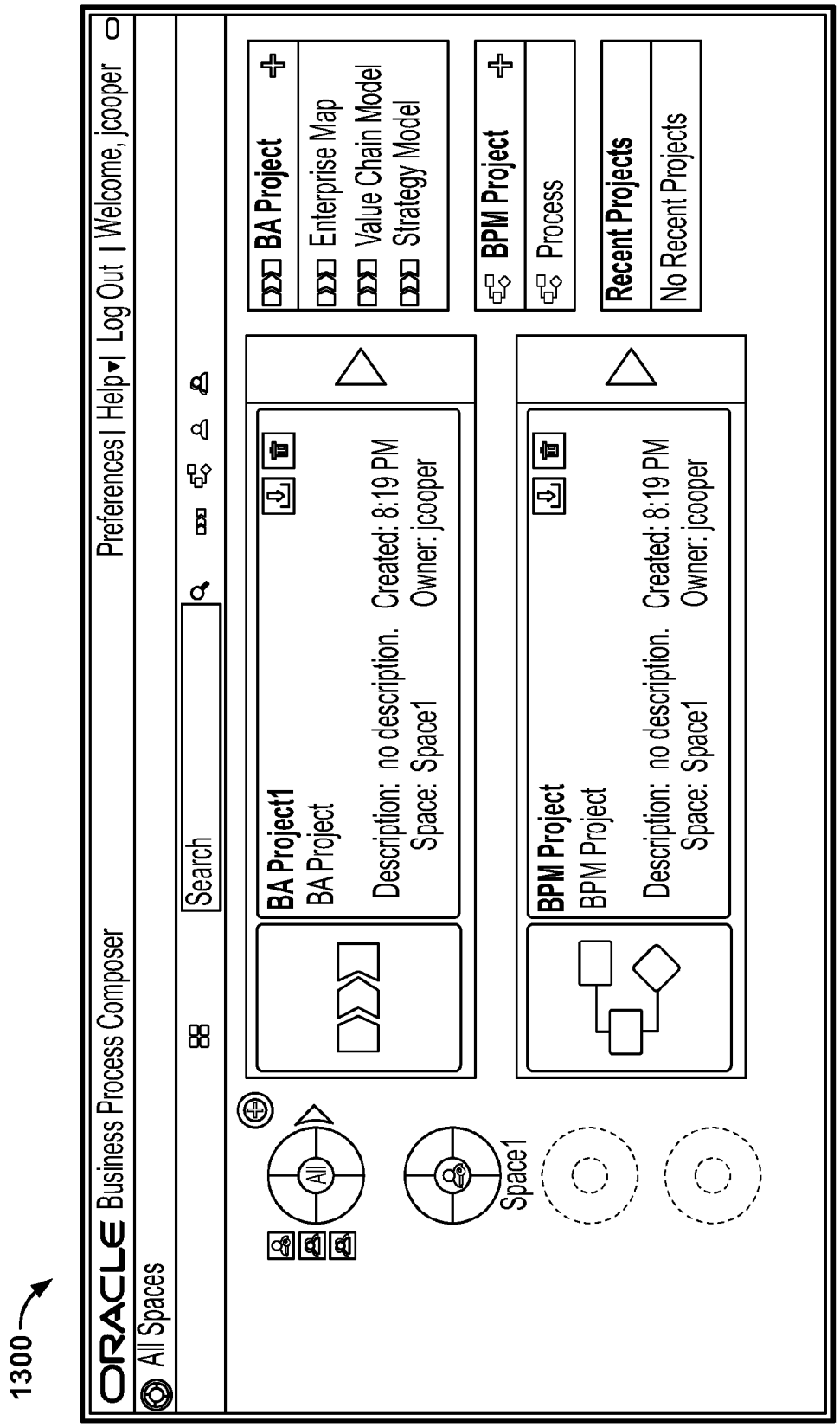
FIG. 13 illustrates a screenshot of a home screen of an editor for use with a business process design environment showing multiple projects, in accordance with an embodiment.

FIG. 13 illustrates a screenshot 1300 of a return to the home page showing that a BA Project and a BPM project have been created, as well as a the new space.

Figure 14:
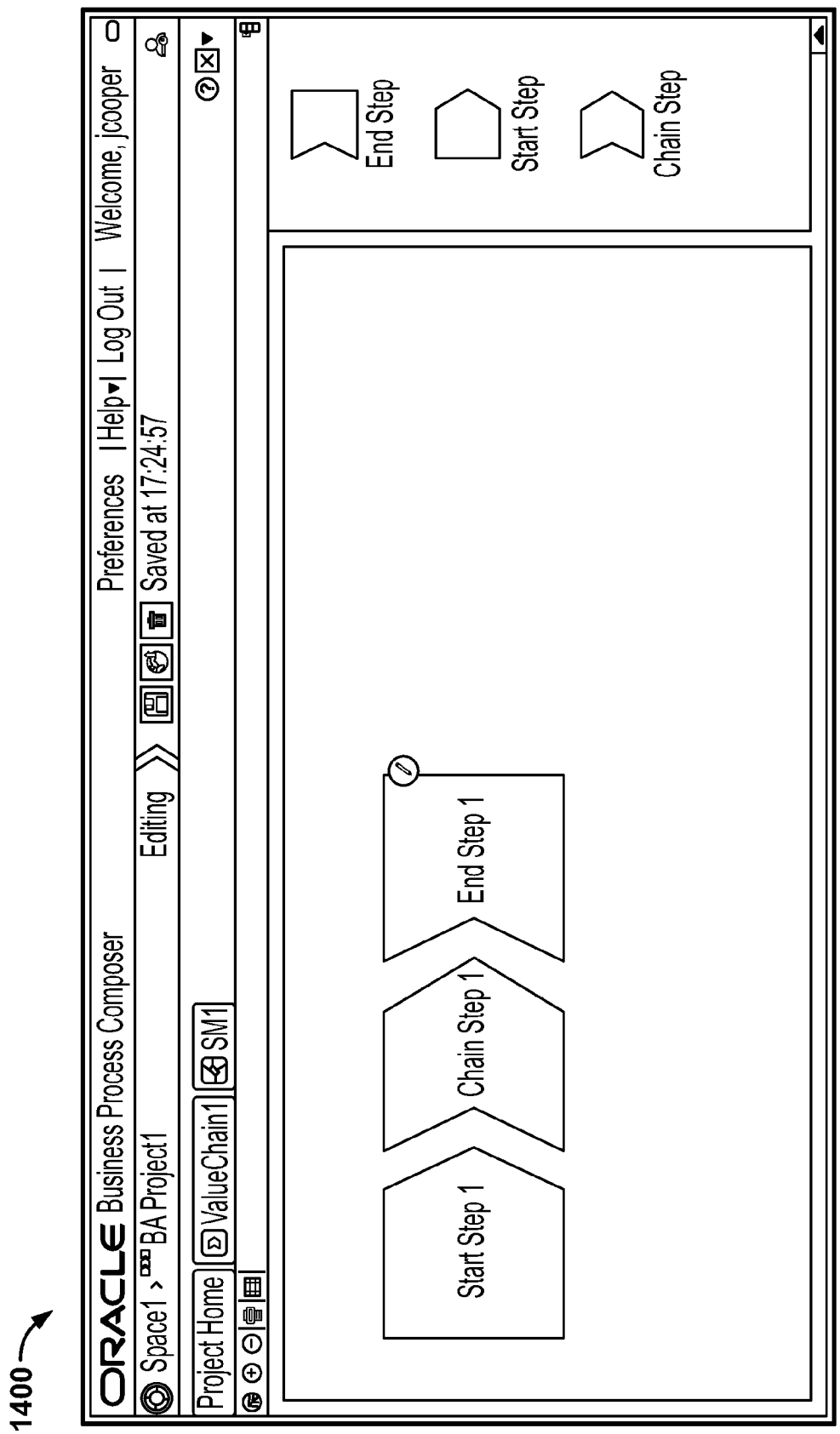
FIG. 14 illustrates a screenshot of a BA project screen of an editor for use with a business process design environment, the BA project comprising a business capability, in accordance with an embodiment.

FIG. 14 illustrates a screenshot 1400 of a value chain model labeled ValueChain1 selected for editing from BA Project1. The value chain model can be assembled from objects found in a palette on the right side of the canvas that are dragged and dropped into the canvas. The objects can call metamodels from a repository, for example. As shown, the value chain model includes three steps: Start Step 1, Chain Step 1 and End Step 1. The steps in the value chain model can be associated with objectives, risks and KPIs, as well as strategy objects.

Figure 15:
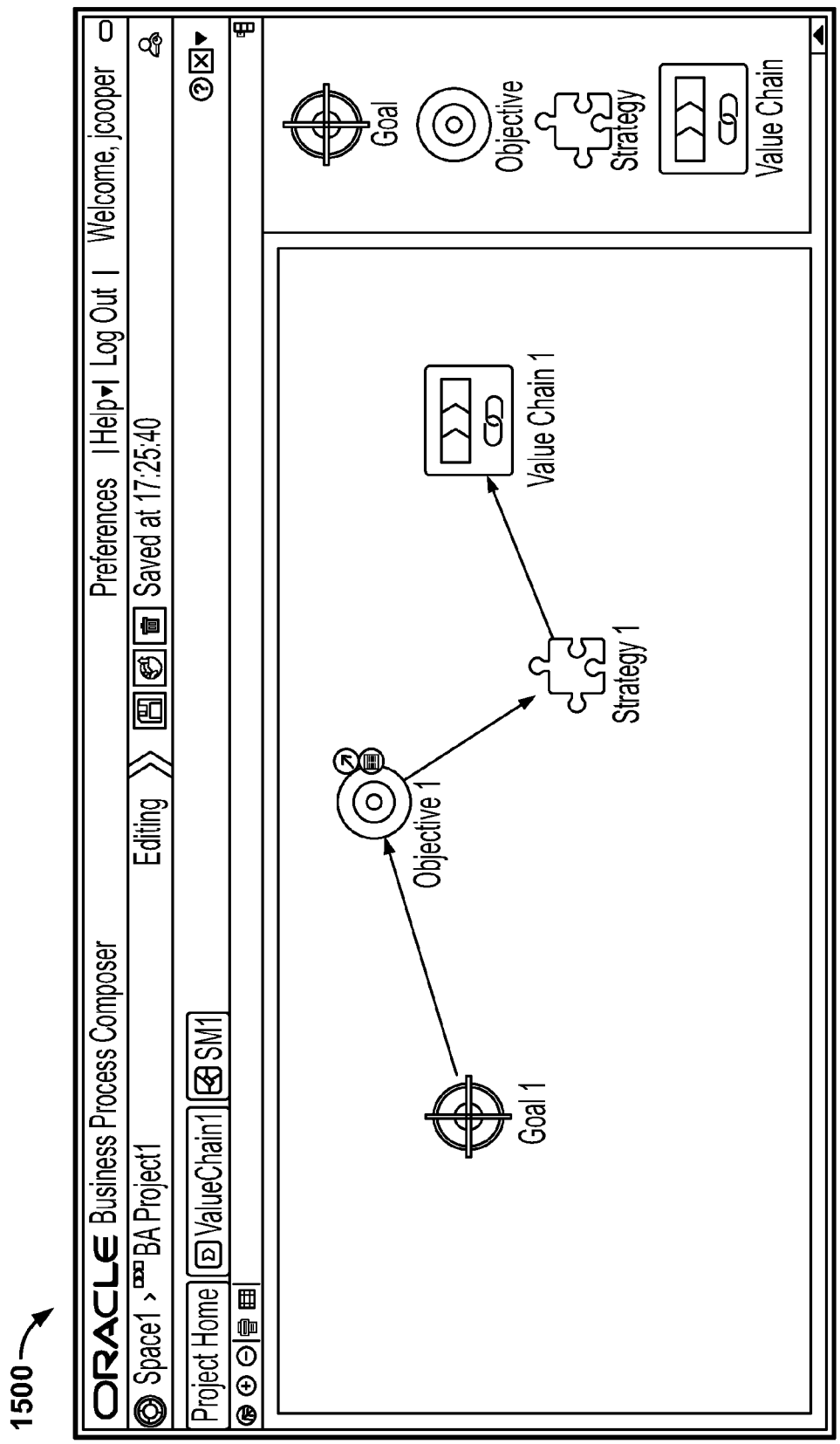
FIG. 15 illustrates a screenshot of a BA project screen of an editor for use with a business process design environment, the BA project comprising a business capability, in accordance with an embodiment.

FIG. 15 illustrates a screenshot 1500 the strategy model labeled SM1 selected for editing from BA Project1. The strategy model can be assembled from objects found in a palette on the right side of the canvas that are dragged and dropped into the canvas. The objects can call metamodels from a repository, for example. As shown, the strategy model includes a goal (Goal 1), an objective (Objective 1), a strategy (Strategy 1), and the value chain model (Value Chain 1), created as shown in FIG. 14. The value chain is used to link the strategy model to the value chain model.

Figure 16:
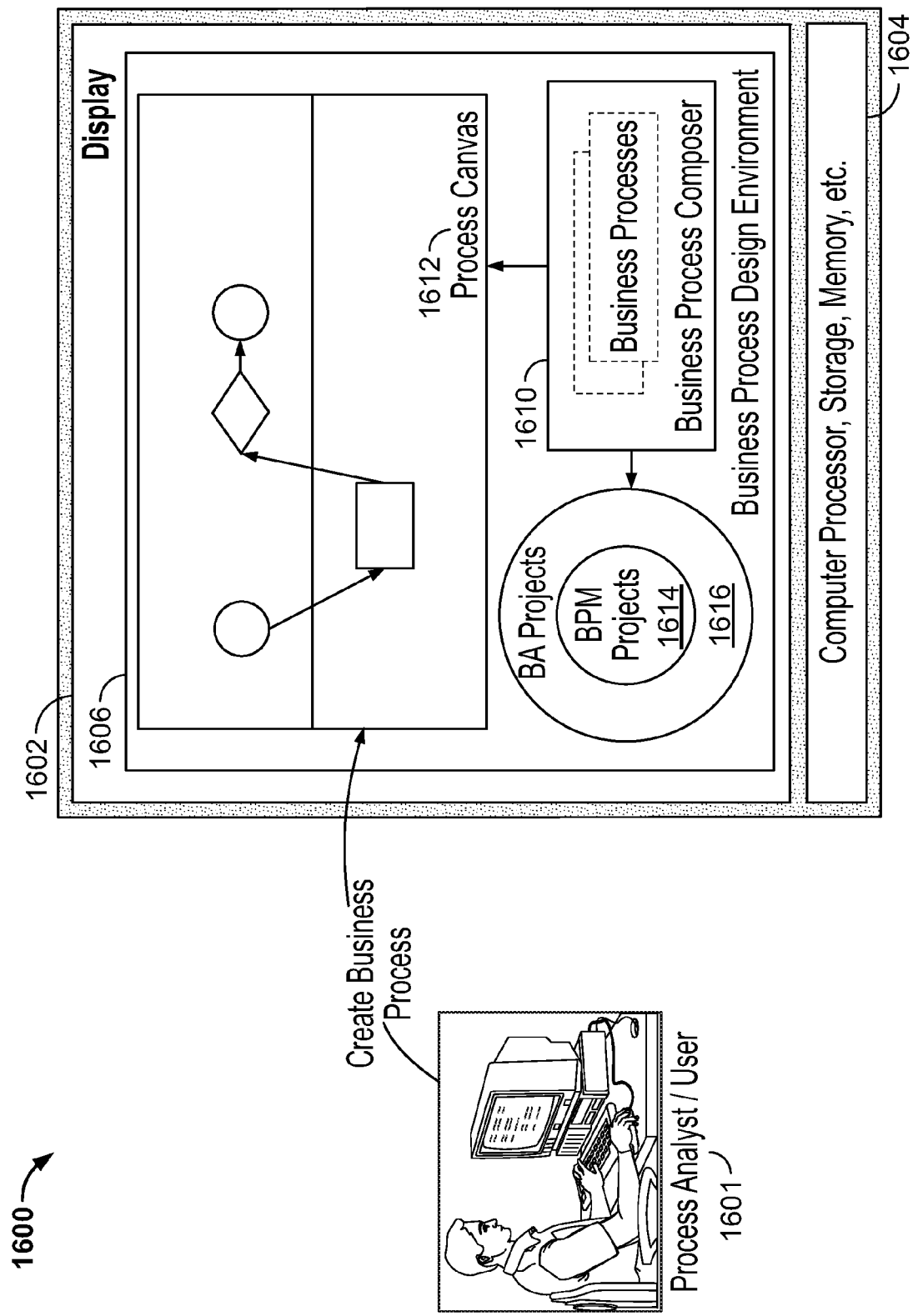
FIG. 16 illustrates a system for providing an editor for use with a business process design environment, in accordance with an embodiment.

FIG. 16 illustrates a system 1600 for providing an editor for use with a design environment 1606 for creating and editing BA projects 1614, BPM projects 1616 and business processes, in accordance with an embodiment. A user 1601, such as a process analyst, can interact with the system to incrementally develop and validate business processes across multiple BA projects and BPM projects within BA projects using a framework including a model component, a view component, and a controller component. In a typical configuration, the user will launch the design environment so that the design environment is presented to the user on a display 1602. The display can be a component of a computer environment 1604, such as a laptop computer, a desktop computer, a tablet, or some other device having local hardware such as a processor, storage, and memory, a terminal accessing remote hardware, or some combination of local and remote hardware. The user can access the design environment using a keyboard/mouse combination, using a pen and touch tablet, using a touch screen of the display, or using any other input device that allows interaction with the design environment. Further, the design environment can be launched from a website and hosted remotely from the user. Alternatively, the design environment can be launched locally via software installed in the computer environment and accessed by the user, or the business design environment can be launched using a combination of remote and local software. The design environment can comprise the editor for creating and editing BA projects and BPM projects, and a product such as Business Process Composer ("Composer") 1610 offered by ORACLE® Corporation that can be used to create and customize business processes on a drawable area called a process canvas 1612 for use in an enterprise computing environment. However, embodiments of the invention can also be used with other design environments that allow a user to create and customize business processes.

FIG. 17 illustrates an example of a process canvas 1712 that acts as an interactive workspace for creating a business process model in a design environment, in accordance with an embodiment. In an embodiment, a user can define one or more roles (e.g., a requester role and an approver role) and create process steps by dragging graphical representations (also referred to herein as a flow object) of process steps and other model components into swim lanes 1722, 1724 associated with the roles that execute the process steps. As shown, the graphical representations are included in a menu of flow objects 1726 in a right panel. As a flow object is dragged into a swim lane, the user designates a process step type (i.e., a sub-process) to be assigned to the flow object. The user can drag flow arrows to connect flow objects in their order of execution. Alternatively, the user can define process steps using some other technique, for example using pull down menus or keyboard shortcuts. The editor can include additional features such as a toolbar that provides options to Navigate, Zoom In, Zoom Out, Undo, Redo, Cut, Copy, Paste, Delete, Auto Layout, etc. In an embodiment, the different components that each model supports can be added by dragging and dropping those components onto the canvas.

Process steps can be automated or can require interaction of a participant (i.e., they can be a human task). As shown, an exemplary business process accepts a request for a car from an employee, approves or rejects the request, and upon approval assigns a car to the employee either from a company fleet or from a booking agency. The exemplary business process shown in FIG. 17 includes three process steps that require interaction by a participant and a series of automated steps. Once a flow is created, the business process can be simulated to generate instances for analysis of process performance. The process canvas represents a view presented to a user by an editor allowing the user to interact with the view to create and revise business process models.

When a user working with a graphical editor in accordance with an embodiment, saves a BA project, a BPM project, and/or a business process, referred to collectively as content, the saved content is stored on a non-transitory computer readable medium. The content, whether a BA project, a BPM project, or a business project, can then be accessed by a system and/or users to develop the content, implement the content, run the content, run simulations of the content, incorporate the content into other projects and/or processes, etc. Further, in embodiments the content can be accessed and edited by users other than the user that initially created or partially created the content, allowing for collaboration among users.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated.

What is claimed is:

1. A method for creating a business architecture, comprising:
   providing a business process design environment operating on one or more processors;
   providing a graphical editor accessible from within the business process design environment, the graphical editor being accessible to a user via a client to load, create and edit a model for a business process management project and a business process within the business process management project;
   wherein a business architecture (BA) project wraps the business process management project and defines collective business services and business information available to the business process management project and the business process;
   wherein the BA project is comprised of one or more metamodels and one or more ontologies;
   wherein a server of the business process design environment comprises
   a model component including a process asset manager (PAM) that provides a repository for storing one or more models loaded, created or edited via the graphical editor,
   a view component configured to request information from the model component to generate an output representation of the one or more models for the graphical editor,
   a controller component configured to send commands to the model component to update a state of the one or more models and send commands to the view component to change the output representation of the one or more models based on the updated state of the one or more models,
   wherein the model component is configured to notify the view component and the controller component of a change in a state of the one or more models, so that the view component generates an updated output representation of the one or more models and the controller component updates an available set of commands,
   wherein the view component is a view bean that delegates access to the controller component, which then accesses an application program interface (API) for the PAM associated with the model component to connect to the PAM, and
   a converter configured to convert information requested via the view component from a format stored by the model component to JavaScript Object Notation (JSON); and
   using the graphical editor associated with the client to render the model for the business process management project and the business process within the business process management project from information in JSON communicated from the server to the client; and
   wherein commands and events sent according to JSON maintain model synchronization between the client and the server.

2. The system of claim 1, wherein the model component is a service that stores and provides assets for generating the business process, the business process management project, and the business architecture project.

3. The method of claim 1, wherein the server of the business process design environment further comprises an application lifecycle management (ALM) service,
   wherein the ALM service maintains separate lifecycles and provides traceability for shared and separate models between business architecture projects.

4. A system for creating a business architecture in a business process design environment, comprising:
   a computer including a processor;
   a graphical editor accessible to a user via a client to load, create and edit a model for a business process management project and a business process within the business process management project;
   wherein a business architecture (BA) project wraps the business process management project and defines collective business services and business information available to the business process management project and the business process;
   wherein the BA project is comprised of one or more metamodels and one or more ontologies;
   a server comprising
   a model component including a process asset manager (PAM) that provides a repository for storing one or more models loaded, created or edited via the graphical editor,
   a view component configured to request information from the model component to generate an output representation of the one or more models for the graphical editor,
   a controller component configured to send commands to the model component to update a state of the one or more models and send commands to the view component to change the output representation of the one or more models based on the updated state of the one or more models,
   wherein the model component is configured to notify the view component and the controller component of a change in a state of the one or more models, so that the view component generates an updated output representation of the one or more models and the controller component updates an available set of commands,
   wherein the view component is a view bean that delegates access to the controller component, which then accesses an application program interface (API) for the PAM associated with the model component to connect to the PAM, and
   a converter configured to convert information requested via the view component from a format stored by the model component to JavaScript Object Notation (JSON); and
   wherein the graphical editor associated with the client is configured to render the model for the business process management project and the business process within the business process management project from information in JSON communicated from the server to the client; and
   wherein the system uses commands and events sent according to JSON to maintain model synchronization between the client and the server.

5. The system of claim 4, wherein the model component is a service that stores and provides assets for generating model.

6. The system of claim 1, further comprising:
   an application lifecycle management (ALM) service associated with the server, wherein the ALM service maintains separate lifecycles and provides traceability for shared and separate models between business architecture projects.

7. A non-transitory computer readable medium, including instructions stored thereon which when read and executed by one or more computers, cause the one or more computers to perform the steps comprising:
   providing a business process design environment;
   providing a graphical editor accessible from within the business process design environment, the graphical editor being accessible to a user via a client to load, create and edit a model for a business process management project and a business process within the business process management project;
   wherein a business architecture (BA) project wraps the business process management project and defines collective business services and business information available to the business process management project and the business process;
   wherein the BA project is comprised of one or more metamodels and one or more ontologies;
   wherein a server of the business process design environment comprises
   a model component including a process asset manager (PAM) that provides a repository for storing one or more models loaded, created or edited via the graphical editor,
   a view component configured to request information from the model component to generate an output representation of the one or more models for the graphical editor, and
   a controller component configured to send commands to the model component to update a state of the one or more models and send commands to the view component to change the output representation of the one or more models based on the updated state of the one or more models,
   wherein the model component is configured to notify the view component and the controller component of a change in a state of the one or more models, so that the view component generates an updated output representation of the one or more models and the controller component updates an available set of commands,
   wherein the view component is a view bean that delegates access to the controller component, which then accesses an application program interface (API) for the PAM associated with the model component to connect to the PAM, and
   a converter configured to convert information requested via the view component from a format stored by the model component to JavaScript Object Notation (JSON); and
   using the graphical editor associated with the client to render the model for the business process management project and the business process within the business process management project from information in JSON communicated from the server to the client; and
   wherein commands and events sent according to JSON maintain model synchronization between the client and the server.

8. The non-transitory computer readable medium of claim 7, wherein the model component is a service that stores and provides assets for generating the business process, the business process management project, and the business architecture project.

9. The non-transitory computer readable medium of claim 7, wherein the server of the business process design environment further comprises an application lifecycle management (ALM) service,
   wherein the ALM service maintains separate lifecycles and provides traceability for shared and separate models between business architecture projects.

* * * * *

UNITED STATES PATENT AND TRADEMARK OFFICE
CERTIFICATE OF CORRECTION

PATENT NO.         : 9,846,849 B2                                         Page 1 of 1
APPLICATION NO.    : 14/295917
DATED              : December 19, 2017
INVENTOR(S)        : Damonte et al.

It is certified that error appears in the above-identified patent and that said Letters Patent is hereby corrected as shown below:

In the Drawings

On sheet 2 of 14, in FIG. 2, Line 10, delete "Conversor" and insert -- Converter --, therefor.

In the Specification

In Column 6, Line 34, delete "convertor" and insert -- converter --, therefor.

In Column 9, Line 3, delete "a the" and insert -- a --, therefor.

Signed and Sealed this
Twenty-fourth Day of July, 2018

Andrei Iancu
*Director of the United States Patent and Trademark Office*